(12) United States Patent
Ball et al.

(10) Patent No.: US 8,925,419 B2
(45) Date of Patent: Jan. 6, 2015

(54) COMPLIANT CAM WITH FLEXURE CAM ARM

(75) Inventors: Donald Ball, Melbourne, FL (US); Christopher Corey, Palm Bay, FL (US); Patrick Waters, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 790 days.

(21) Appl. No.: 13/081,833

(22) Filed: Apr. 7, 2011

(65) Prior Publication Data

US 2012/0255392 A1 Oct. 11, 2012

(51) Int. Cl.
*F16H 53/02* (2006.01)
(52) U.S. Cl.
CPC ........................................ *F16H 53/02* (2013.01)
USPC ............................................... 74/569; 74/567
(58) Field of Classification Search
USPC ............ 74/36, 568 R, 568 FS, 569; 123/90.6, 123/90.16, 90.17
See application file for complete search history.

(56) References Cited

U.S. PATENT DOCUMENTS

| | | | |
|---|---|---|---|
| 1,894,663 A * | 1/1933 | Burnett | 74/568 R |
| 3,433,091 A | 3/1969 | Jullien-Davin | |
| 3,710,043 A * | 1/1973 | Linn et al. | 200/19.21 |
| 3,885,470 A | 5/1975 | Costa et al. | |
| 3,987,688 A | 10/1976 | Tarbet | |
| 4,148,601 A | 4/1979 | Kulabukhov et al. | |
| 5,076,782 A | 12/1991 | Campbell et al. | |
| 5,447,325 A * | 9/1995 | DePue et al. | 280/124.106 |
| 5,679,991 A | 10/1997 | Wolf | |
| 7,455,302 B2 | 11/2008 | Young et al. | |
| 2008/0241309 A1 | 10/2008 | Niewels et al. | |

FOREIGN PATENT DOCUMENTS

| | | | |
|---|---|---|---|
| DE | 931141 | 1/1955 | |
| JP | 2003139109 A * | 5/2003 | F16B 2/18 |

* cited by examiner

*Primary Examiner* — Thomas Diaz
(74) *Attorney, Agent, or Firm* — Harness, Dickey & Pierce P.L.C.

(57) ABSTRACT

A compliant cam system includes a one-piece cam including: a cam body rotatable with respect to a cam rotational axis and a having a cam body center spaced from the cam rotational axis and an outer surface; and a deflecting arm freely extending from the cam body having a free end elastically deflected toward the cam body in an arm deflected condition. A follower has at least one follower surface in direct contact with the cam outer surface at the deflecting arm. An arm non-deflected condition is defined when the outer surface is in direct contact with the cam follower surface prior to deflection of the deflecting arm. The cam when thereafter rotated with respect to the cam rotational axis acts to move the cam body center toward the follower thereby deflecting the deflecting arm to the deflected condition creating a biasing force acting toward the follower.

14 Claims, 5 Drawing Sheets

COMPLIANT CAM WITH FLEXURE CAM ARM

FIELD

The present disclosure relates to cam and follower systems used to create an over-center locking position for component retention.

BACKGROUND

Cam and follower designs are known wherein the cam is a solid member which when rotated brings one or more lobes of the cam into contact with the follower to displace a member. Cams can be used to create top-dead center and over-center contact positions to create locking positions of components and/or fastening designs. Disadvantages of known cam and follower systems are that because the cam is not flexible the component being contacted must either be flexible, or a deflection system must be provided, or example in the form of biasing springs or biasing devices separate from the cam and component to allow the cam lobe displacement to occur in reaching the cam locked position. The disadvantages are further manifested in multiple part systems, increasing the system cost, increasing system complexity and creating alignment/tolerance issues that must be accommodated. Cam, follower and component wear also result from the frictional contact of the cam which requires subsequent adjustment of the cam and/or follower positioning.

SUMMARY

According to several embodiments, a compliant cam system of the present disclosure includes a cam body. A deflecting arm is connected to and freely extends from the cam body and has an arm free end spatially separated from the cam body defining an arm non-deflected condition.

According to further embodiments, a compliant cam system includes a one-piece cam including: a cam body rotatable with respect to a cam rotational axis and a having a cam body center spaced from the cam rotational axis and an outer surface; and a deflecting arm freely extending from the cam body having a free end elastically deflected toward the cam body in an arm deflected condition. A follower has at least one follower surface in direct contact with the cam outer surface at the deflecting arm. An arm non-deflected condition is defined when the outer surface is in direct contact with the cam follower surface prior to deflection of the deflecting arm. The cam when thereafter rotated with respect to the cam rotational axis acts to move the cam body center toward the follower thereby deflecting the cam body to the deflected condition creating a biasing force acting toward the follower.

According to still other embodiments, a compliant cam system has a one-piece cam including a cam body having a generally or substantially circular shape defining a generally or substantially circular outer surface, and a cam rotational axis spaced from a cam body center. A deflecting arm having a generally or substantially circular shape freely connected to and extending from the cam body has a free end elastically deflected toward the cam body in an arm deflected condition. A guide member is included with a follower slidably disposed in the guide member, the follower having a follower surface. An arm non-deflected condition is defined when the deflecting arm is in direct contact with the follower surface prior to deflection of the deflecting arm. The cam when thereafter rotated moves the cam body center between the cam rotational axis and the deflecting arm thereby deflecting the deflecting arm to the deflected condition creating a biasing force acting toward the follower.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
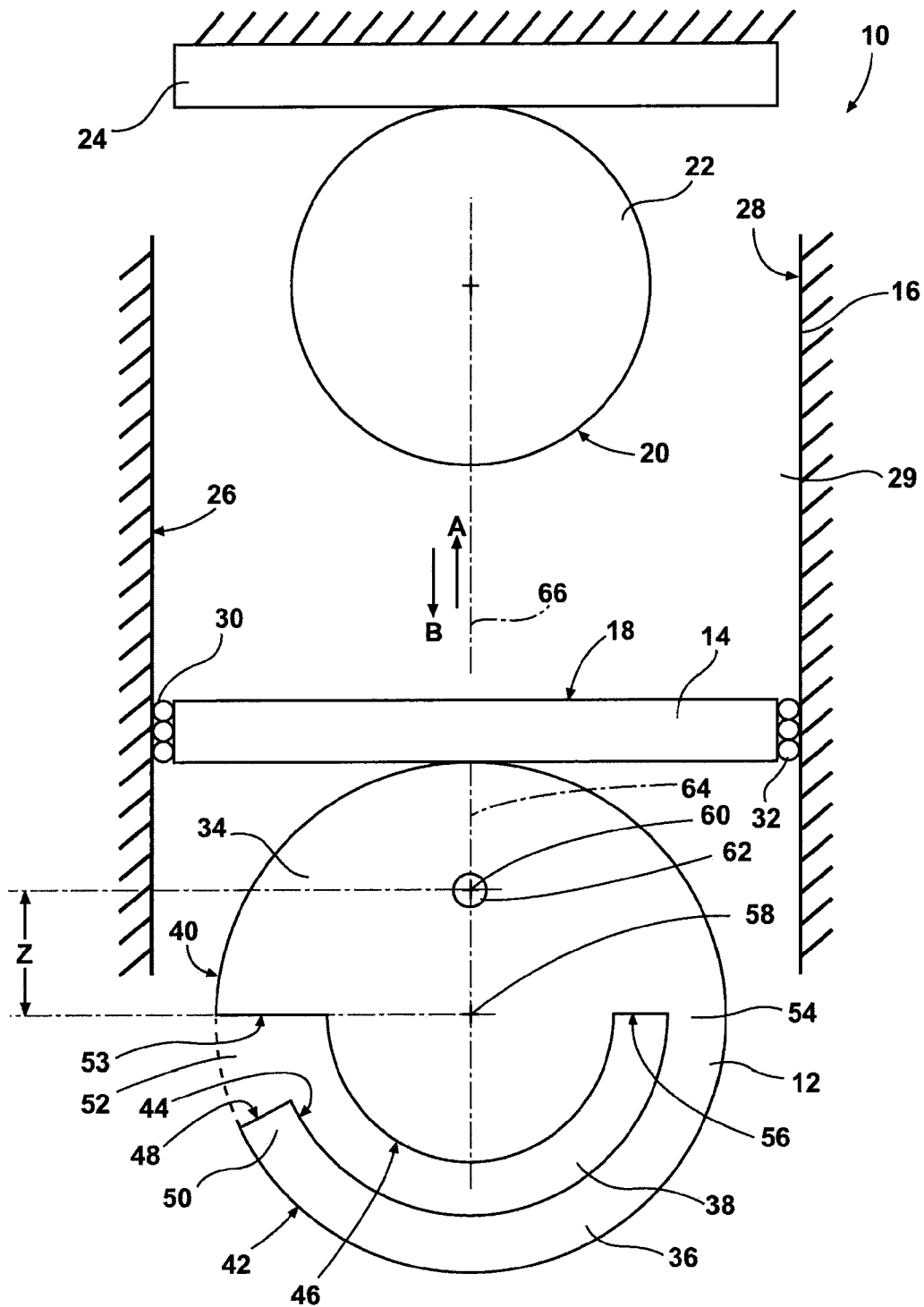
FIG. 1 is a front elevational view of a compliant cam with a flexure cam arm of the present disclosure with the cam in a bottom dead center position.

Referring to FIG. 1, a cam system 10 includes a compliant cam 12 which is positioned in contact with and when rotated acts to displace a member such as a follower 14. Rotation of the compliant cam 12 causes co-movement of the follower 14, with the follower 14 sliding within and guided by a guide member 16 until a first contact surface 18 of follower 14 contacts an outer surface 20 of a work-piece 22. Compliant cam 12 continues to rotate to displace follower 14 in a first direction "A" until contact is made between follower 14 and work-piece 22. Work-piece 22 is held or fixed in position by a fixed member 24.

Guide member 16 can include opposite first and second guide walls 26, 28, which between them define a follower sliding bore 29 within which at least a portion of compliant cam 12 can be positioned and within which follower 14 is slidably displaced. To promote a controlled sliding motion of follower 14, first and second bearing members 30, 32 are oppositely positioned about follower 14, having first bearing member 30 in slidable contact with first guide wall 26 and second bearing member 32 in slidable contact with second guide wall 28.

Compliant cam 12 includes a cam body 34 which, according to several embodiments, is one-piece, homogenous and substantially solid, and can be made from a polymeric or a metal material. According to other embodiments compliant cam 12 can be made as a composite of materials. A deflecting arm 36 is integrally and according to several embodiments also homogeneously connected to and extends freely away from cam body 34. The deflecting arm 36 can therefore be a homogeneous extension of a material of the cam body 34. The term "homogeneous" as used herein refers to components of the compliant cam 12 including the cam body 34 and deflecting arm 36 wherein connections between the components are provided during the manufacturing process such that mechanical, welded, bonded, or similar connection methods for the deflecting arm 36 are not used. Deflecting arm 36 can define a semicircular shape and is spaced from cam body 34 throughout substantially all of a length of deflecting arm 36 by an arm void space 38. Arm void space 38 can be provided having a substantially similar shape to the shape of deflecting arm 36 and can be created during a molding operation, or by removing material in a machining or forming operating.

According to several embodiments, cam body 34 defines a geometric shape, e.g., a circular shape as shown, or an oval, obround, or other geometric shape having a cam body outer surface 40 defining an outer perimeter of cam body 34. Deflecting arm 36 includes an arm outer surface 42 which, according to several embodiments, substantially coextensively aligns with the cam body outer surface 40, and therefore according to several embodiments, also defines a semicircular or arc shape. Deflecting arm 36 also includes an arm inner surface 44 which can be equally or non-equally spaced from a void inner wall 46 by arm void space 38 in a non-deflected condition of deflecting arm 36. A thickness of deflecting arm 36 can be controlled, together with selection of the material of the cam body 34 and deflecting arm 36 to predetermine a value of a biasing force deflecting arm 36 will create when deflected.

Deflecting arm 36 can further include an arm end face 48 located at an arm free end 50, which are both freely spaced from cam body 34 by a gap 52 such that arm end face 48 is spatially separated from a gap end wall 53, thereby providing clearance for arm end face 48 and arm free end 50 to deflect toward void inner wall 46. Gap 52 has a gap end wall 53 also acting as a first arm void space 38 end wall. An arm connecting end 54 is oppositely located with respect to arm free end 50 and provides for mechanical or homogeneous connection of deflecting arm 36 to cam body 34. A second void space end wall 56 of arm void space 38 can be aligned with a cam body center 58 (as shown) or offset with respect to cam body center 58. Cam body center 58 is the geometric center of compliant cam 12.

A cam rotational axis 60 is coaxially aligned with a cam mount aperture 62, and both are spatially separated from cam body center 58 by a spacing dimension "Z". Cam mount aperture 62 is provided to rotatably connect compliant cam 12 to a rotating component (not shown) such as a shaft of a motor using a rotational fastener (not shown). In a first or bottom-dead-center position of compliant cam 12 shown, both cam body center 58 and cam rotational axis 60 are coaxially aligned on a cam displacement axis 64 with cam rotational axis 60 positioned above cam body center 58. Cam displacement axis 64 in the bottom-dead-center position of compliant cam 12 is centrally aligned between first and second guide walls 26, 28.

According to additional embodiments, in the bottom-dead-center position of compliant cam 12 cam displacement axis 64 is coaxially aligned with a bore axial centerline 66 of follower sliding bore 29 such that opposed portions of cam body outer surface 40 are substantially equally spaced with respect to each of first and second guide walls 26, 28. Follower 14 is displaced in the first direction "A" by rotation of compliant cam 12 and, conversely, can also be displaced in an opposite second direction "B" by an opposite rotation of compliant cam 12 to provide either direct contact between first contact surface 18 and outer surface 20 of work-piece 22 or to provide a clearance space or distance between first contact surface 18 and outer surface 20.

A depth or thickness and a geometry in cross section of compliant cams 12 of the present disclosure can vary. Although compliant cams 12 having opposed, substantially planar faces and outer body surface 40 which is substantially perpendicular to the faces can be used, additional geometries can also be used. These include but are not limited to at least one of the faces being curved, non-symmetrical, faceted, or the like. Portions of the outer body surface 40 can also be angular, irregular or raised.

Figure 2:
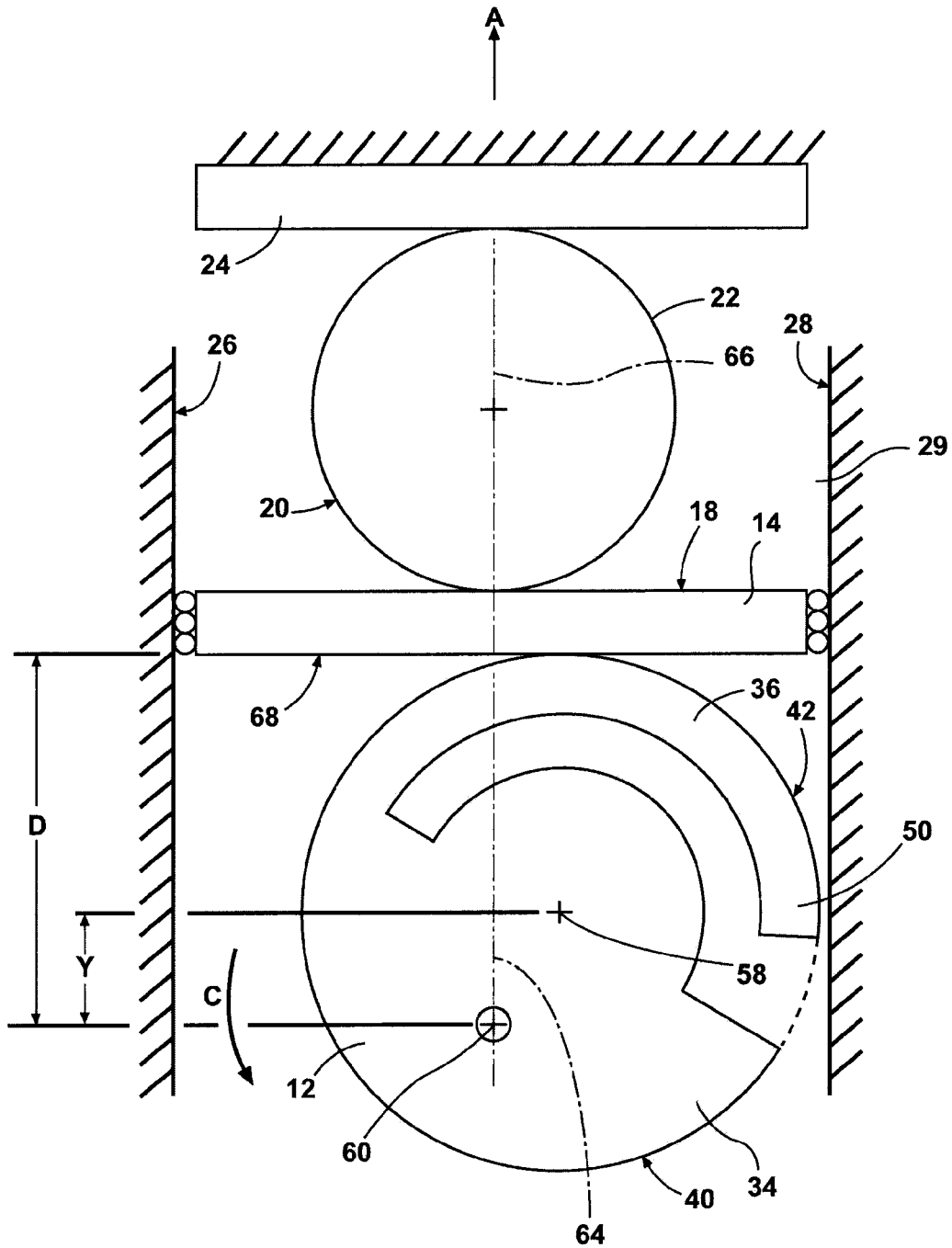
FIG. 2 is a front elevational view of the compliant cam of FIG. 1 with the cam rotated to a work-piece contact position.

Referring to FIG. 2, the mechanical advantage of compliant cam 12 is used by converting a rotational motion of compliant cam 12 into a displacement of follower 14. Initially, direct contact is made between cam body outer surface 40 and a second contact surface 68 of follower 14. As compliant cam 12 rotates, the arm outer surface 42 is brought into direct contact with second contact surface 68. As compliant cam 12 is further rotated, for example in a counter-clockwise direction of rotation "C" by rotation through cam rotational axis 60, a difference in spacing between cam rotational axis 60 and second contact surface 68 is created. As cam body center 58 moves in a relatively upward direction parallel to first direction "A", follower 14 is displaced in the first direction "A". Compliant cam 12 is rotated in the cam direction of rotation "C" until cam body center 58 is positioned to the right of cam displacement axis 64 and bore axial centerline 66, as shown. This position provides direct contact between arm outer surface 42 of deflecting arm 36 and second contact surface 68 of follower 14. When initial contact is made between first contact surface 18 of follower 14 and outer surface 20 of work-piece 22, cam rotational axis 60 is positioned at a first spacing dimension "D" with respect to second contact surface 68. At this time, a deflection of deflecting arm 36 is minimal, defining a substantially non-deflected condition, having arm outer surface 42 and cam body outer surface 40 together defining a substantially circular coextensive geometry. From this condition any additional force acting on deflecting arm 36 will cause greater deflection of deflecting arm 36. Because follower 14, work-piece 22 and fixed member 24 are substantially incompressible, any subsequent rotation of compliant cam 12 about cam rotational axis 60 in the cam direction of rotation "C" will therefore result in an inward deflection of deflecting arm 36.

Referring to FIG. 3 and again to FIGS. 1 and 2, compliant cam 12 is shown following additional rotation about cam direction of rotation "C" until cam rotational axis 60 and cam body center 58 are once again both coaxially aligned with cam displacement axis 64 and bore axial centerline 66, defining a top-dead-center position of compliant cam 12. The top-dead-center position of compliant cam 12 is rotated substantially 180 degrees with respect to the position of compliant can 12 in the bottom-dead-center position. If cam rotational axis 60 is maintained at a second spacing dimension "E", which is substantially equal to first spacing dimension "D" (shown and described in reference to FIG. 2), an inward deflection of arm free end 50 of deflecting arm 36 in an arm deflecting direction "F" will occur. The inward deflection of arm free end 50 results in arm inner surface 44 moving toward void inner wall 46, thereby decreasing a clear width of arm void space 38 proximate to arm free end 50. This inward deflection of deflecting arm 36 occurs elastically, thereby creating a biasing force between deflecting arm 36 and both follower 14 and work-piece 22 having a component of the biasing force acting parallel to first direction "A".

As previously noted, the bottom-dead-center position is established when cam rotational axis 60 is positioned closest to follower 14 having cam body center 58 positioned furthest from follower 14, having both coaxially aligned with cam displacement axis 64 and bore axial centerline 66. Conversely, the top-dead-center position is established when cam body center 58 is positioned closest to follower 14 having cam rotational axis 60 positioned furthest from follower 14, again having both coaxially aligned with cam displacement axis 64 and bore axial centerline 66. The top-dead-center position defines a maximum deflected condition of arm free end 50. It is also noted that the top-dead-center position of compliant cam 12 also provides substantially equal spacing between opposed portions of cam body outer surface 40 and each of the first and second guide walls 26, 28. The biasing force acting in the first direction "A" in the top-dead-center position of compliant cam 12 is directed through the center of work-piece 22 and thereby maximizes a holding force retaining follower 14 in direct contact with work-piece 22. The maximum deflected position of arm free end 50 positions arm outer surface 42 proximate to arm free end 50 at a furthest inward position with respect to the non-deflected arm position 70 shown in phantom in FIG. 3.

Figure 3:
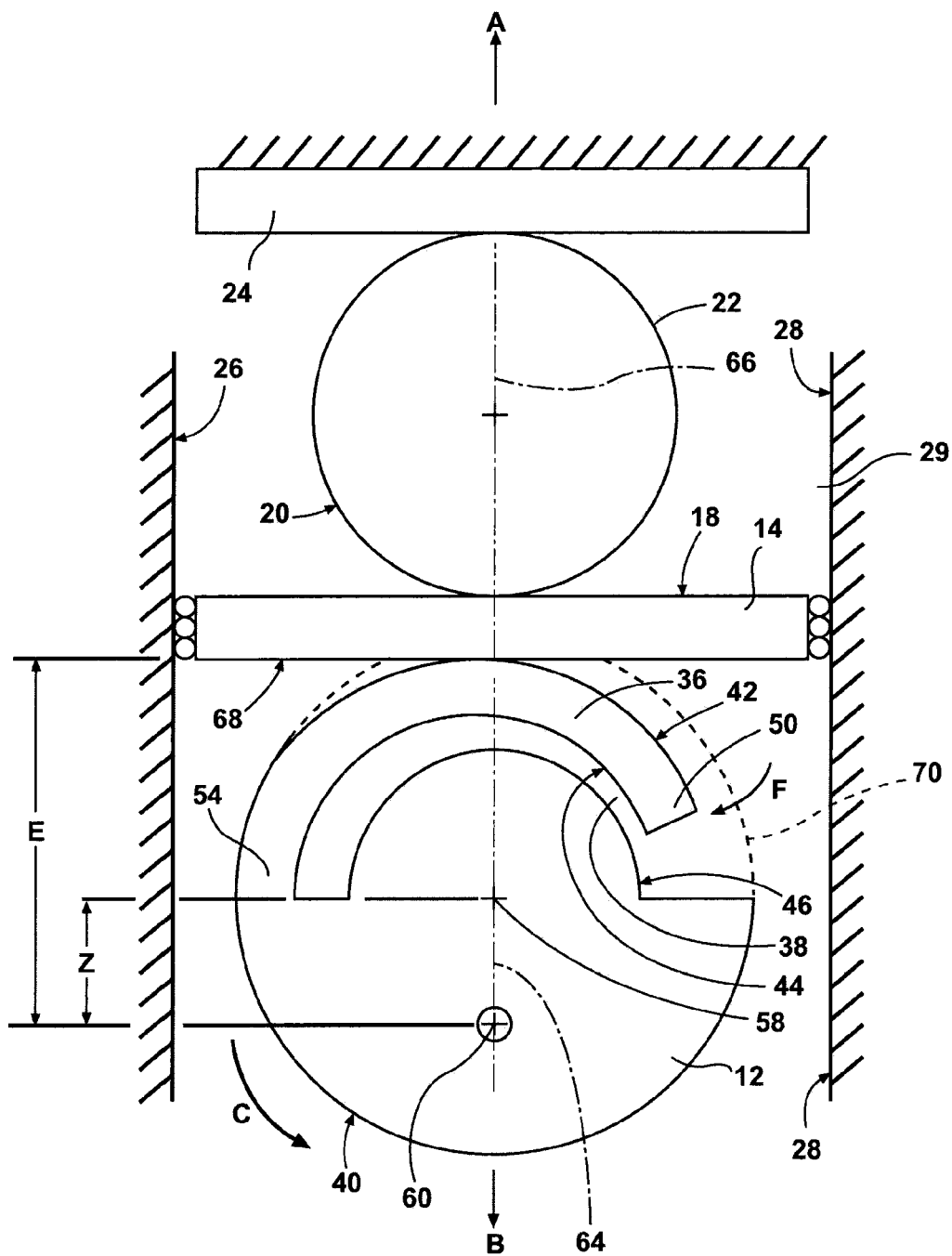
FIG. 3 is a front elevational view of the compliant cam of FIG. 1 with the cam in a top dead center position.
Figure 4:
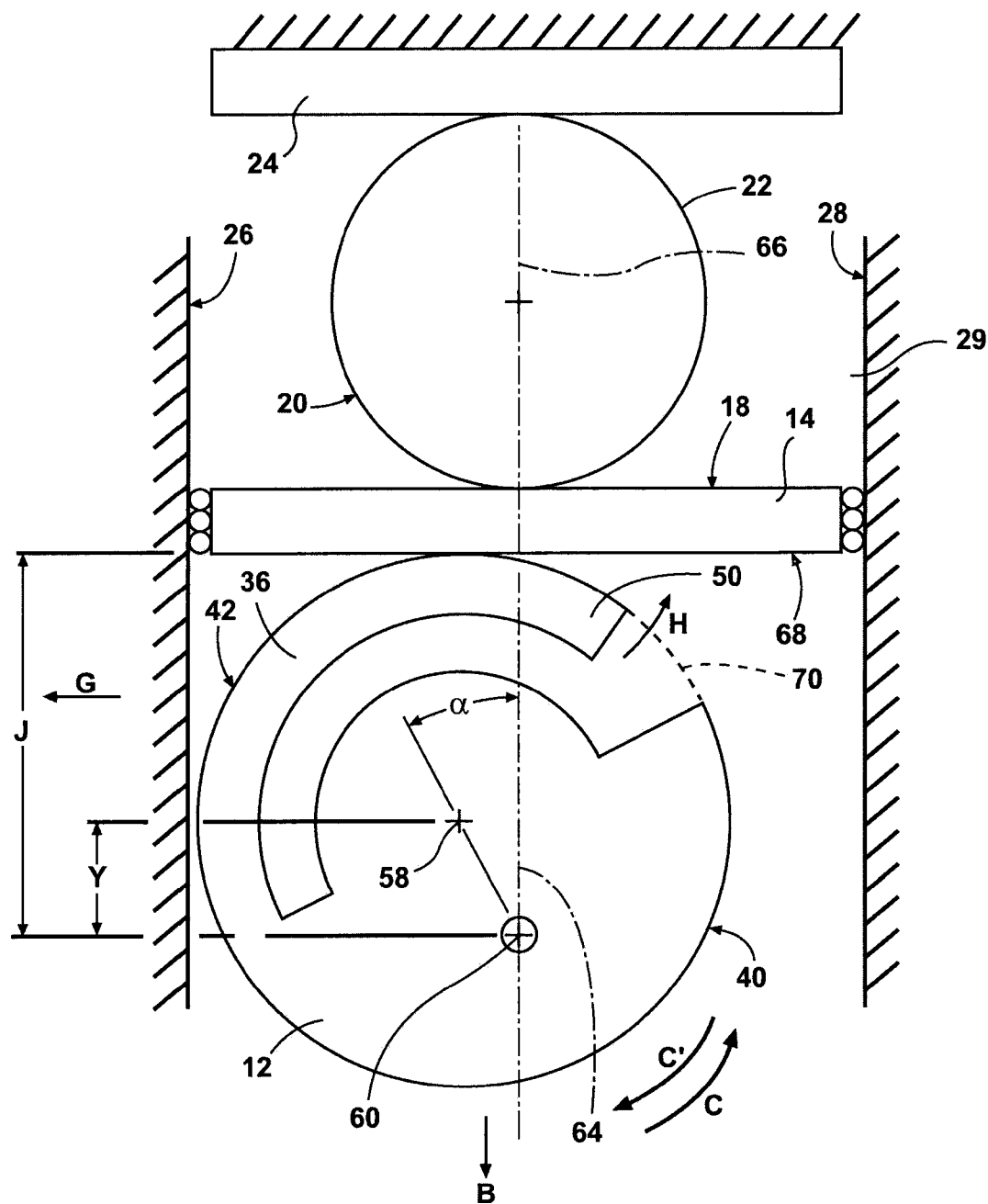
FIG. 4 is a front elevational view of the compliant cam of FIG. 1 with the cam rotated to an over-center contact position.

Referring to FIG. 4 and again to FIGS. 1-3, from the top-dead-center position of compliant cam 12 shown in FIG. 3, continued rotation of compliant cam 12 in the cam direction of rotation "C" displaces cam body center 58 toward first guide wall 26, thereby creating an over-center retention position for compliant cam 12. In the over-center position, cam body center 58 is rotated to an angle a with respect to cam displacement axis 64, which allows arm free end 50 to elastically deflect in a second arm deflecting direction "H" substantially back to its original, substantially non-deflected condition shown in FIG. 2. In the over-center position, arm outer surface 42 can extend nearly out to or equal with the position shown for non-deflected arm position 70.

By maintaining the over-center position of cam body center 58 with respect to cam rotational axis 60, a third spacing dimension "J" between cam rotational axis 60 and second contact surface 68 of follower 14 is created. According to several embodiments, third spacing dimension "J" can be less than or substantially equal to first spacing dimension "D". In the cam over-center position the cam body center 58 is rotated away from alignment with the bore axial centerline 66 by an angle a thereby creating a fourth spacing dimension "Y" between the cam body center 58 and the cam rotational axis 60. Fourth spacing dimension "Y" is calculated by determining the cosine of angle a because the true spacing between cam body center 58 and cam rotational axis 60 is unchanged. Third spacing dimension "J" is selected to permit the deflecting arm 36 to elastically deflect substantially back to the substantially non-deflected position. Displacement of both follower 14 and compliant cam 12 in the second direction "B" is resisted in the over-center position because a force required to inwardly deflect deflecting arm 36 is required before compliant cam 12 and follower 14 will move in the second direction "B" or until compliant cam 12 is oppositely rotated in a clockwise direction "C'" to return compliant cam 12 to the position shown in FIG. 2.

Referring to FIG. 5 and again to FIGS. 1-4, a cam system 100 includes a compliant cam 102 which is modified from compliant cam 12. Compliant cam 102 includes a cam body 104 which can be made from a polymeric, composite or metal material similar to compliant cam 12. A deflecting arm 106 freely extends from cam body 104 similar to deflecting arm 36. According to several embodiments, compliant cam 102 can include a cam body outer surface 108 having a geometric shape similar to or different from the geometric shape of compliant cam 12. According to several embodiments, the cam body outer surface 108 can be provided in a substantially semicircular shape, having an arm outer surface 110 in a non-deflected condition coextensively aligned with cam body outer surface 108.

An arm connecting end 112 mechanically or homogeneously connects deflecting arm 106 to cam body 104. Deflecting arm 106 is spaced from cam body 104 by an arm void space 114 such that an arm free end 116 of deflecting arm 106 is freely spaced at a gap 118 from a void inner wall 120. Similar to compliant cam 12, compliant cam 102 can further include a cam rotational axis 122 centrally disposed with respect to a cam mount aperture 124. Cam rotational axis 122 is spatially separated from a cam body center 126.

Cam system 100 can further include a follower 127, in the form of a wheel or disc, having a follower surface 128 defining a substantially circular shape. When follower surface 128 contacts arm outer surface 110 as compliant cam 102 is rotated in a cam direction of rotation "L", arm free end 116 elastically deflects in a first arm deflecting direction "K" into gap 118 and toward void inner wall 120. According to several embodiments, arm free end 116 has a tapered shape such that an arm end face 129 defines a point or sharp end. In general, if a thickness of deflecting arm 106 remains constant, as the point of contact between the follower and the cam moves away from the connected end of deflecting arm 106, an "effective stiffness" of the deflecting arm 106 decreases in an approximately linear relationship with respect to rotation angle. By changing the geometry such as a thickness of deflecting arm 106 (in the present example by decreasing the thickness), a non-linear relationship between rotation angle and effective stiffness can be achieved. As effective stiffness decreases, bias force will decrease for a given displacement of deflecting arm 106. Therefore because deflecting arm 106 has a taper shape decreasing in thickness toward the free end, the taper shape continuously reduces an effective stiffness of the deflecting arm 106 from the cam body 104 to the free end 116.

Figure 5:
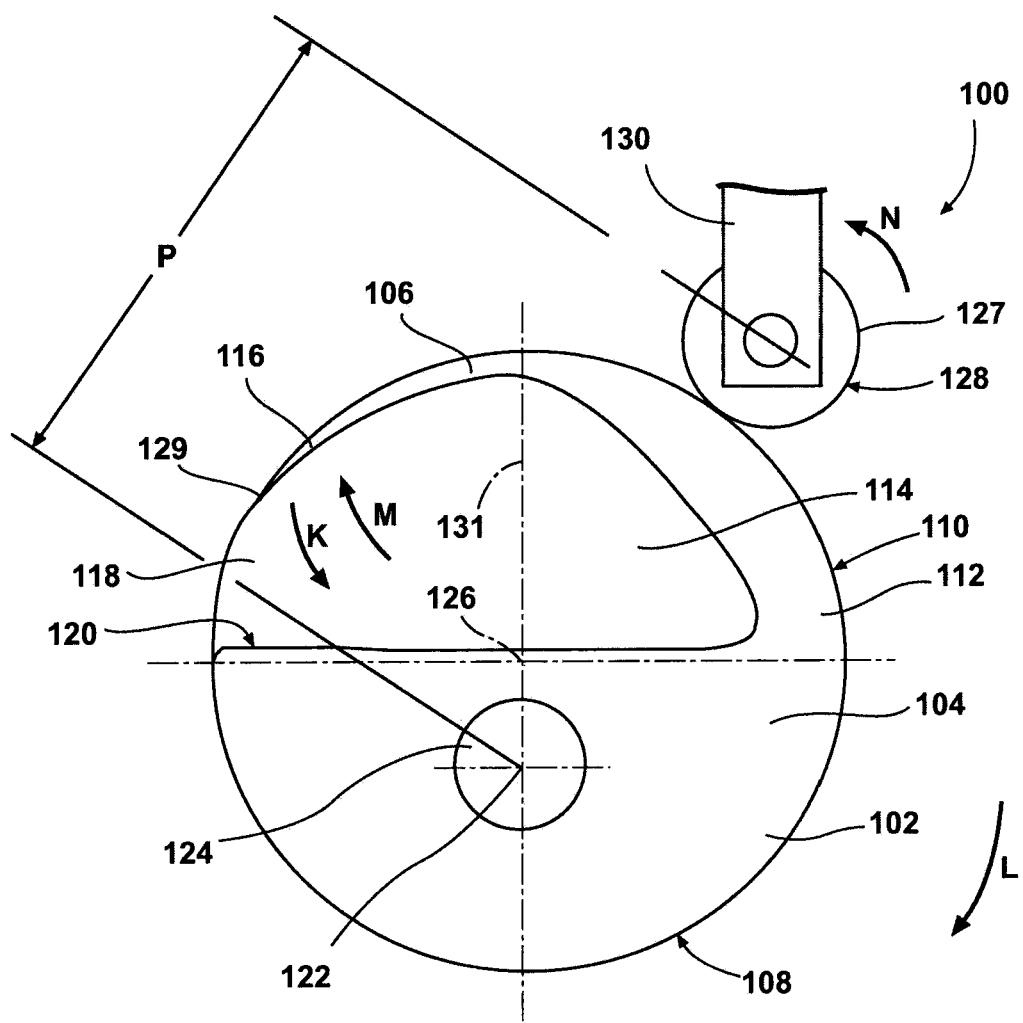
FIG. 5 is a front elevational view of another embodiment of a compliant cam of the present disclosure.

If compliant cam 102 is oppositely rotated (e.g., in a counterclockwise direction), deflecting arm 106 will elastically rebound to the non-deflected position shown in FIG. 5 in a second arm deflecting direction "M". The follower 127 operates differently with respect to follower 14 previously described. Follower 127 is a wheel member rotatably connected to a follower support member 130 such that direct contact between follower surface 128 and arm outer surface 110 causes a rotation of follower 127 in a follower direction of rotation "N", which is opposite to the direction of rotation of compliant cam 102. Deflection of compliant cam deflecting arm 106 results during rotation of compliant cam 102 in the cam direction of rotation "L" because a spacing dimension "P" varies between follower 127 and cam rotational axis 122 as the cam body center 126 changes rotational position with respect to cam rotational axis 122 during cam rotation. The maximum deflection of deflecting arm 106 occurs when cam rotational axis 122, cam body center 126 and a cam displacement axis 131 are all aligned with the center of follower 127. Similar to compliant cam 12, an off-center locking position can also be provided by compliant cam 102 when follower 127 contacts arm outer surface 110 to the left of (as viewed in FIG. 5) cam displacement axis 131 which extends through cam rotational axis 122.

Compliant cams of the present disclosure offer several advantages. By permitting a portion such as a deflecting arm of the compliant cam to displace inwardly during rotation of the compliant cam, the resistive forces generated create a biasing force of the deflecting arm that permits over-center locking positions to be achieved by the compliant cam. This eliminates additional hardware, biasing members, and/or contact surfaces required by known cam systems to permit the work-piece to displace when the cam is rotated. In the present disclosure, the work-piece can therefore be fixed in position and the total quantity of components of the cam system can be reduced, compared to known cam systems. The use of either polymeric, metal, and/or composite materials for compliant cams of the present disclosure allow a wide variety of biasing forces to be created using different materials for the compliant cam, and further permitting reduced frictional forces between the arm outer surface in contact with the follower.

A total mass of the compliant cams is also reduced through the use of the arm void space created between the deflecting arm and the cam body. This also permits greater rotational speeds of the cam due to the reduced inertial force required to initiate rotation of the cam. The amount of biasing force created by the deflecting arms of the compliant cams of the present disclosure can also be further modified by control of either or both the material of the compliant cam and/or the geometry of the deflecting arm. This allows compliant cams of the present disclosure to be engineered for a wide variety of applications, all fitting within substantially the same space envelope of a single compliant cam.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compliant cam system, comprising:
a cam rotatable about a cam rotational axis and along a cam displacement axis, the cam including
a cam body having an outer engagement surface, and
a deflecting arm connected to and freely extending from the cam body, the deflecting arm having an arm free end spatially separated from the cam body by an arm void space in an arm non-deflected condition; and
a follower having a follower engagement surface, the cam is rotated along the displacement axis in a first direction into direct contact with an engagement surface of the follower such that the follower is displaced away from the cam along a cam displacement axis, the arm free end of the deflecting arm is elastically deflected toward the cam body and into the arm void space in response to the cam body being in direct contact with the engagement surface of the follower, wherein a center of the cam body and the cam rotational axis coaxially align with the cam displacement axis in a top-dead-center position, the cam displacement axis oriented substantially perpendicular to the at least one follower engagement surface and the cam body center positioned between the cam rotational axis and the at least one follower engagement surface.

2. The compliant cam system of claim 1, wherein the deflecting arm is homogeneously connected to the cam body at an arm connecting end, and an arm end face of the deflecting arm is separated from the cam body by a gap having a gap end wall also creating a void space end wall.

3. The compliant cam system of claim 1, wherein the deflecting arm and the arm void space collectively define a partial circular shape.

4. The compliant cam system of claim 1, wherein the center of the cam body is a geometric center spaced from and positioned between the cam rotational axis and the deflecting arm.

5. The compliant cam system of claim 1, wherein the deflecting arm defines a substantially circular shape.

6. The compliant cam system of claim 1, wherein the deflecting arm is a homogeneous extension of a material of the cam body.

7. A compliant cam system, comprising:
a cam including:
   a cam body rotatable with respect to a cam rotational axis, the cam body having a cam body center spaced from the cam rotational axis and a cam outer surface; and
   a deflecting arm freely extending from the cam body and having a free end;
a follower having at least one follower surface in contact with the cam outer surface; and
an arm substantially non-deflected condition defined when the outer surface is in direct contact with the cam outer surface prior to deflection of the deflecting arm, wherein the cam having both the cam rotational axis and the cam body center coaxially aligned with a cam displacement axis in a top-dead-center position, the cam displacement axis oriented substantially perpendicular to the at least one follower surface and the cam body center positioned between the cam rotational axis and the at least one follower surface.

8. The compliant cam system of claim 7, further including an arm deflected condition creating a biasing force acting toward the follower created in the top-dead-center position by a displacement of the cam body center toward the follower thereby elastically deflecting the deflecting arm.

9. The compliant cam system of claim 8, further including an over-center condition reached by continued rotation of the cam in a cam direction of rotation beyond the top-dead-center position until the cam body center is rotated to an angle with respect to the cam displacement axis thereby permitting the deflecting arm to deflect away from the cam body.

10. The compliant cam system of claim 7, wherein the follower has a planar shape slidably disposed in a guide member, having a substantially planar follower surface in direct contact with the deflecting arm in the non-deflected condition, rotation of the cam body decreases a spacing dimension between the follower surface and the cam rotational axis thereby elastically deflecting the deflecting arm toward the cam body creating an arm deflected condition.

11. The compliant cam system of claim 7, further including a bottom-dead-center position of the cam having both the cam rotational axis and the cam body center coaxially aligned with the cam displacement axis, the cam displacement axis oriented substantially perpendicular to the at least one follower surface and the cam rotational axis positioned between the cam body center and the at least one follower surface.

12. A compliant cam system, comprising:
a one-piece cam including:
   a cam body having a substantially circular shape defining a substantially circular outer surface, and a cam rotational axis spaced from a cam body center; and
   a deflecting arm having a substantially circular shape freely connected to and extending from the cam body and elastically deflectable with respect to the cam body, the deflecting arm having a free end which when deflected toward the cam body defines an arm deflected condition;
a follower positioned in contact with the cam, the follower having a follower surface; and
an arm non-deflected condition defined when the deflecting arm is in direct contact with the follower surface prior to deflection of the deflecting arm, the cam when thereafter rotated moving the cam body center between the cam rotational axis and the deflecting arm thereby elastically deflecting the deflecting arm to the deflected condition creating a biasing force acting toward the follower, wherein in the deflected condition the cam body is positioned to a top-dead-center position having the cam body center positioned between the cam rotational axis and the follower and having both the cam body center and the cam rotational axis coaxially aligned on a bore axial centerline of a guide member in which the follower is slidably disposed.

13. The compliant cam system of claim 12, wherein the rotational axis of the cam body is aligned with the bore axial centerline of the guide member during rotation of the cam body.

14. The compliant cam system of claim 12, wherein in a cam over-center position the cam body center is rotated away from alignment with the bore axial centerline by an angle thereby creating a spacing between the cam body center and the cam rotational axis defined as the cosine of the angle, the spacing selected to permit the deflecting arm to elastically deflect away from the cam body.

* * * * *